United States Patent [19]

Schmenk et al.

[11] Patent Number: 5,701,141
[45] Date of Patent: Dec. 23, 1997

[54] DIGITIZER TABLET SYSTEM WITH DUAL-MODE CURSOR/MOUSE

[75] Inventors: Steven R. Schmenk, Scottsdale; Donald A. Beauvais, Phoenix, both of Ariz.

[73] Assignee: Calcomp, Inc., Anaheim, Calif.

[21] Appl. No.: 708,905

[22] Filed: Sep. 5, 1996

Related U.S. Application Data

[63] Continuation of Ser. No. 993,973, Dec. 15, 1992, abandoned, which is a continuation of Ser. No. 869,101, Apr. 16, 1992, abandoned, which is a continuation of Ser. No. 432,073, Nov. 6, 1989, abandoned.

[51] Int. Cl.$^6$ .................................................. G09G 5/08
[52] U.S. Cl. ............................ 345/157; 345/163; 345/173
[58] Field of Search .................................. 345/156, 157, 345/162, 163, 168, 172, 173

[56] References Cited

U.S. PATENT DOCUMENTS

| | | | |
|---|---|---|---|
| 4,578,768 | 3/1986 | Racine | 178/18 |
| 4,654,648 | 3/1987 | Herrington et al. | 340/706 |
| 4,677,258 | 6/1987 | Kawashima et al. | 178/18 |
| 4,698,626 | 10/1987 | Sato et al. | 340/710 |
| 4,906,843 | 3/1990 | Jones et al. | 340/710 |
| 4,954,817 | 9/1990 | Levine | 178/18 |

FOREIGN PATENT DOCUMENTS

| | | |
|---|---|---|
| 0 283 244 | 5/1986 | European Pat. Off. . |
| 62 058 324 | 3/1987 | Japan . |

*Primary Examiner*—Mark R. Powell
*Assistant Examiner*—Matthew Luu
*Attorney, Agent, or Firm*—Michaeslon & Wallace; William F. Porter, Jr.

[57] ABSTRACT

This is a dual-mode digitizing tablet system for providing inputs to a user program. There is a tablet with an active surface and an output connected to the computer. A cursor is moveable over the surface for generating a first signal reflecting the position thereof. Two switch-activating buttons on the cursor generate a second signal when pushed. A position history table holds a last position of the cursor and a menu definition table holds entries defining menu selections associated with the user program as a function of pre-established positions on the tablet. Dual-mode logic is disposed between the tablet and the user program for determining and storing a present location of the cursor, for outputting the present location of the cursor when one of the buttons is pressed, for otherwise outputting both the present location and relative movement of the cursor, and for outputting an indication when the other button is pressed. Finally there is an interfacing program disposed between the dual-mode logic and the user program for receiving the present location of the cursor when the one button is pressed, for using the present location of the cursor to retrieve an associated one of the menu selections from the menu definition table, and for providing the menu selection to the user program. Replaceable menu overlays for each user program are clipped to the tablet surface.

10 Claims, 3 Drawing Sheets

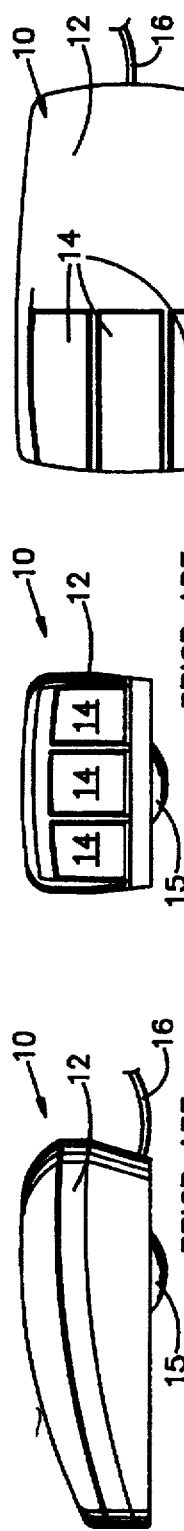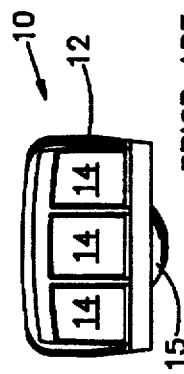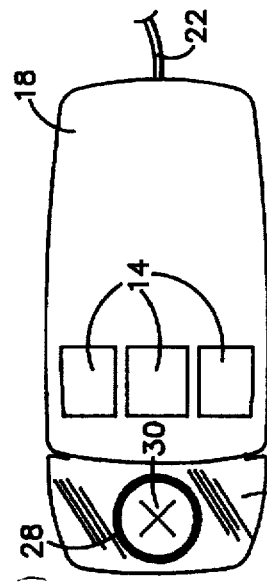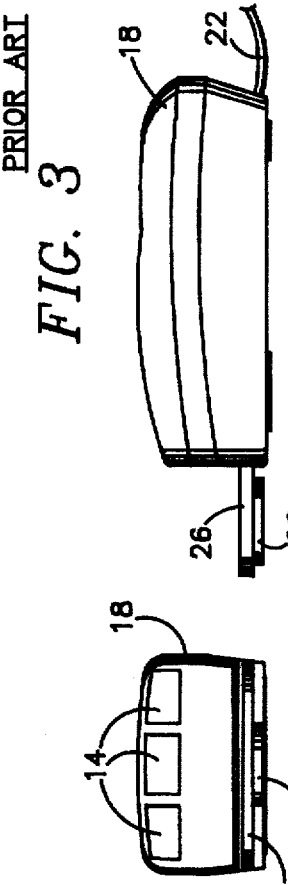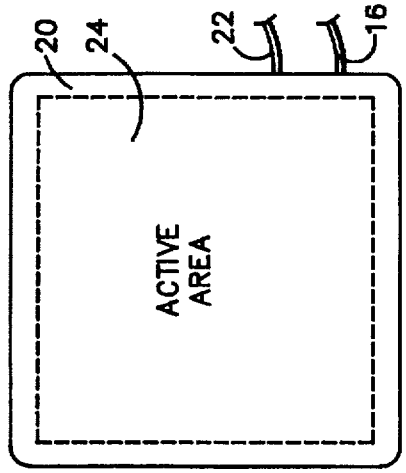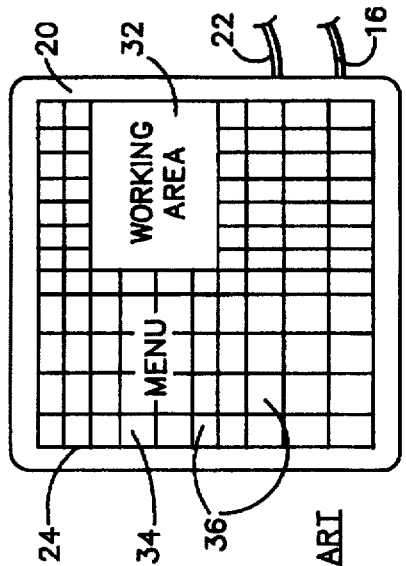

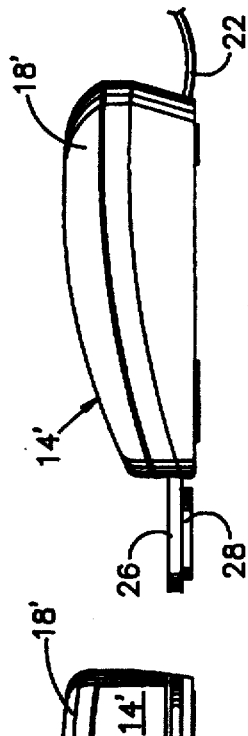
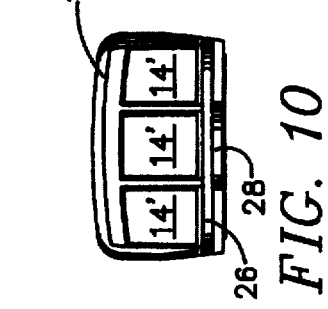
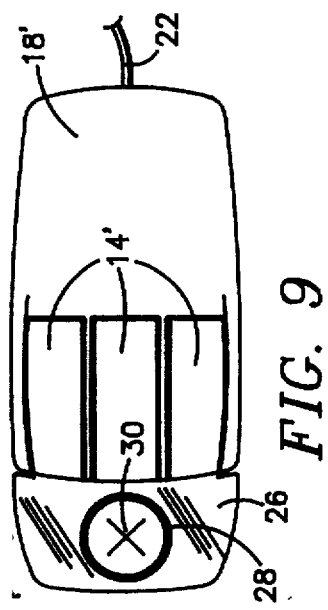
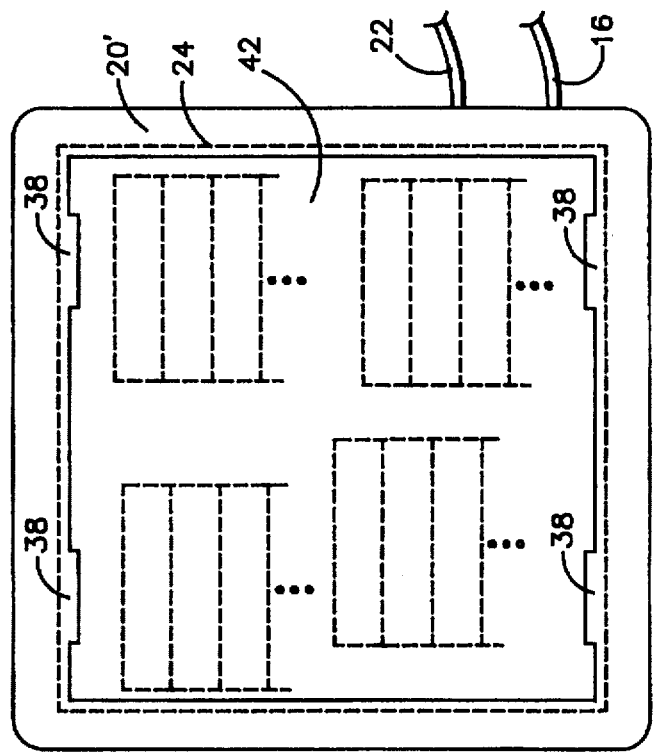
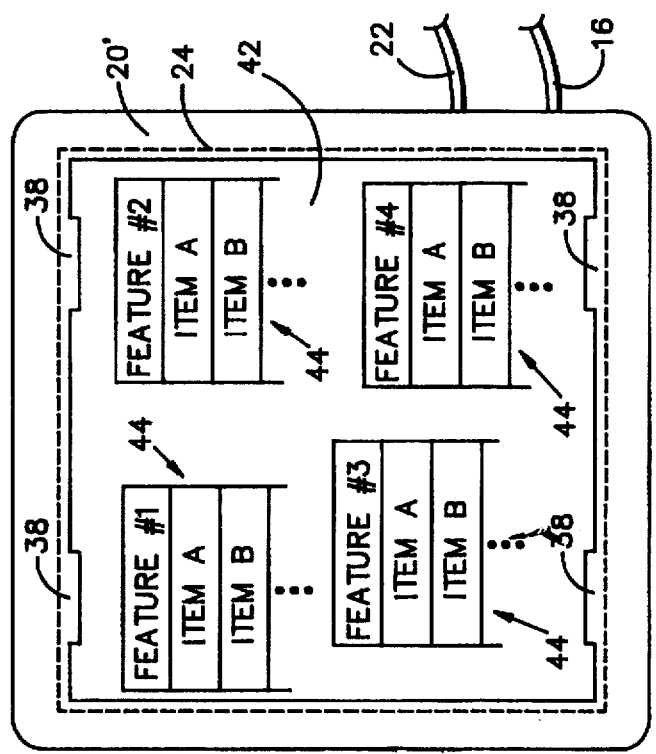

DIGITIZER TABLET SYSTEM WITH DUAL-MODE CURSOR/MOUSE

This is a continuation, of application Ser. No. 07/993,973, filed Dec. 15, 1992, now abandoned, which is a continuation, of application Ser. No. 07/869,101, filed Apr. 16, 1992, now abandoned, which is a continuation, of application Ser. No. 07/432,073, filed Nov. 6, 1989, now abandoned.

BACKGROUND OF THE INVENTION

This invention relates to digitizer systems for providing inputs to a computer and, more particularly, in a digitizing tablet system wherein the position on the surface of a tablet of a cursor device having at least two switch-activating buttons is sensed and signals reflecting the position of the cursor device and the pushing of the buttons are output to a computer connected thereto for use by a computer program running therein, to the improvement of the present invention to provide for user-controlled, dual-mode operation of the cursor device comprising, position history table means for holding at least a last position of the cursor device; and, dual-mode logic means disposed between the tablet and cursor device on one side and the computer program on another side for determining a present absolute location of the cursor device on the surface of the tablet and storing it in the position history table means, for supplying the computer program with the present absolute location of the cursor device on the surface of the tablet to indicate a menu selection location when a pre-selected one of the switch-activating buttons is pressed by a user, and for otherwise supplying the computer program with both the present absolute location of the cursor device on the surface of the tablet and an indication of relative movement of the cursor device across the surface of the tablet by the user being the difference between the present location of the cursor device on the surface of the tablet and a next previous location of the cursor device on the surface of the tablet from the position history table means whereby the user can selectively control the use of the cursor device as an absolute position device or as a relative movement device.

A primary object of most computer systems and the software packages operating thereon is to be "user friendly". In other words, early computers could only be operated by persons trained in operating them. Accordingly, the number of computers available was few and they were mostly in business, military, and educational environments. With the advent of "personal computers", however, virtually everyone has the potential of being impacted by computer availability. Even at the kindergarten and pre-school level, programs like LOGO allow even the youngest children to interface with the computer on a real-time basis and in a productive manner.

A major step in the attaining of user friendly status in various popular computer systems has been the introduction of various input "pointing" devices. Discounting so-called "video games" and their "joy-sticks" as being outside of the dynamic actual computer interface under consideration, the first major input device to attain general use and popularity was the mouse. A typical prior art mouse is shown in FIGS. 1–3 where it is generally indicated as 10. The mouse 10 has a body 12 which is easily gripped between a user's thumb and outer fingers to be slid across a surface (generally adjacent the keyboard of the computer). The body 12 has one or more switches (not shown) inside which can be activated by pressing the buttons 14 on the top of the body 12 with the index or middle finger which extend along the top of the body 12 when the mouse 10 is in use. While there are optical mice (requiring a special surface for movement), the usual approach is to have a weighted rubber ball 15 inside of the body 12 which rolls on the surface when the mouse 10 is slid over it. Sensing apparatus (not shown) inside of the body develops a pair of changing signals corresponding to longitudinal movement of the mouse 10 and transverse movement of the mouse 10 corresponding to movement in an orthogonal X-Y coordinate system lying in the plane of the surface over which the mouse 10 is being moved. These signals and the closing of the switches by the pressing of the buttons 14 are transmitted to the computer (not shown) attached thereto by means of the connecting cable 16. Typically the cable 16 is connected to a serial input port of the computer since the data rate of transfer is slow enough to allow use of the simpler and less costly serial approach as opposed to inputting on a parallel basis.

Most, if not all, of the word processing, spread sheet, and desktop publishing programs in common use today operate on a menu system. Typically, the user views the dynamic portions of the program on a monitor while providing inputs thereto from the computer's keyboard or by movement of a mouse (such as mouse 10). Changes in the function being performed are made through menu selection. Typically, the menu selections can be input through the keyboard if desired. It is easier and more "user friendly", however, to make the menu selections using the mouse and simply pointing to the desired option. In some cases, the menu selections are located at one or more of the edges of the monitor display. The mouse is simply moved across and up/down in a manner which makes a cursor appearing on the screen (which moves in combination with movement of the mouse 10) move to the s desired menu selection. One of the buttons 14 is then pressed to make the computer (and program running therein) implement the menu selection just made.

Where the running program is complex and provides numerous menu options and sub-options, it is virtually impossible to locate the menu options around the display. In such cases, it is common to employ so-called "pull-down" menus. Only major menu headings are displayed on the monitor. To make a menu selection, the user moves the mouse 10 to the major menu heading containing the desired menu selection and presses one of the buttons 14. The computer then "pulls down" the entire menu associated with the selected heading across as much of the display as needed. The user then employs the mouse to make further selections—which may include further pulling down of sub-menu portions. When the final menu selection of the chain has been made, the computer implements the selection and removes the menu portions from the display to allow further use of the display in its normal manner.

As will be realized and recognized from the foregoing description, the mouse 10 of FIGS. 1–3 operates in a relative mode; that is, the computer program sensing the inputs from the mouse 10 recognizes only movement of the mouse 10 in the X and Y directions as it is slid over the surface upon which it is resting. If the mouse 10 is lifted and repositioned on the surface, no change in the signal to the computer will occur.

For some computer-based operations (most notably computer aided design (CAD) drawing digitizing), a method of indicating absolute position was necessary. For this purpose, digitizing tablet systems such as that shown in simplified form in FIGS. 4–7 were developed. A digitizing tablet system is comprised of two portions—a cursor device 18 (as depicted in FIGS. 4–6) and a tablet 20 (as depicted in FIG. 7). The cursor device 18 can take the shape of a pen wherein the position of the tip thereof is sensed or can be a so-called "puck" as in the case of the cursor device 18 depicted in FIGS. 4–6. The puck type of cursor device is typically the more versatile. In a digitizing tablet system, the tablet 20 provides the surface over which the cursor device 18 is moved and there is an interaction between the two which permits the position of the cursor device 18 on the surface of the tablet 20 to be sensed. Thus, such systems operate in an absolute mode. When the mouse 10 was lifted and moved to another position on its supporting surface, its output signal did not change. By contrast, if the cursor device 18 is lifted and moved to a new position on the surface of the tablet 20, the signal output will change to reflect the new absolute position of the cursor device 18. Various ways are employed in the art to determine the position of the cursor device 18 on the surface of the tablet 20. One of the more common is electromagnetic field sensing. The cursor device 18 is connected to the tablet 20 by a connecting cable 22 and the tablet 20, in turn, is connected to the computer by a connecting cable 16 like the mouse 10. The tablet 20 has a grid of horizontal and vertical wires (not shown) therein extending over an active area 24. The cursor device 18 has a transparent frontpiece 26 containing a coil of wire 28 connected to the cable 22. Typically, several buttons 14 connected to switches (not shown) are also provided as in the case of the mouse 10 so that the user can provide selection inputs to the computer. The frontpiece 26 has a set of crosshairs 30 formed therein at the electrical center of the coil of wire 28. If an alternating current signal is applied to the coil of wire 28, it will induce an electrical signal into the wires of the grid in the tablet 20 which can be sensed to provide and indication of the absolute location of the crosshairs 30 on the surface of the tablet 20. Alternatively, the wires of the grid can be "strobed" with a current signal which will induce a signal into the coil of wire 28. By knowing the timing of the strobed signal, the point in time when the signal is induced into the coil of wire 28 can be employed to provide and indication of the absolute location of the crosshairs 30 on the surface of the tablet 20. Thus, to input a drawing into a CAD system employing the digitizing tablet system of FIG. 4–7, a user would tape the drawing over the active area 24 of the tablet 20, move the crosshairs 30 along the lines of the drawing to be digitized into the computer, and press one of the buttons 14 at each point to be digitized.

Once such digitizing tablet systems became available, their potential for other uses and as an improvement over the mouse 10 soon became apparent to those skilled in the art. For example, when dynamically drawing with a CAD system employing a mouse and a menu system on the display, much time is lost working through the menu system to make desired selections. By replacing the mouse with the digitizing tablet system and some interfacing software, a user's throughput on a CAD system can be increased dramatically. The prior art approach to this solution is depicted in FIG. 8. An overlay is placed on the surface of the tablet 20 covering some or all of the active area 24. There is a small working area 32 corresponding to the contents of the monitor display in which the actual "drawing" is done by the user. Surrounding the working area 32 is a menu grid 34 containing blocks 36 representing the various menu selections possible. The blocks 36 each contains an indicia (not shown) indicating what menu function is associated with the block. Prior to use, the menu grid 34 and its position must be identified to the using program by a setup routine. The user employs the computer keyboard and the cursor device 18 to indicate the number of blocks 36 in various grid portions along with their corner locations and the corner locations of the working area. In use, the user moves the coil of wire 28 over the working area 32 to draw while watching the display on the monitor to see the results of the movement. To change functions, the crosshairs 30 are positioned on the block 36 associated with the new function and one of the buttons 14 is pressed to cause the computer to sense the position of the crosshairs 30, recognize the position as a particular menu function, and implement that function. The user then returns to drawing in the working area 32 with the new function.

As those skilled in the art will readily recognize and appreciate, the foregoing approach to using a digitizing tablet system with combined menu and working area designations within the active area could provide similar benefits to other menu-driven application programs such as desktop publishing, spread sheets, word processing, etc. Unfortunately, there are several factors working against such uses. The primary one is cost. A typical "small" digitizing tablet system retails for about $500. Moreover, the same "small" tablet is about eighteen inches square—not an insignificant footprint on the average user's desktop. Accordingly, the necessary interfacing software has not been written for such other applications. The only concession to the existence of such other applications in the overall working environment of persons and companies having digitizing tablet systems for use with CAD systems in the manner of FIG. 8 is a mouse emulation program which allows the user to use his cursor device 18 on the tablet 20 in the manner of a mouse (i.e. the signal representing absolute position is used to calculate relative movement which is output to the using program) so that both a mouse and tablet system are not necessary and the user does not have to switch between them. Unfortunately, such emulation programs do not appear to work in a satisfactory emulation of a mouse and most users do use both devices and switch between them depending on which device the program being used expects as its input device.

Wherefore, it is an object of this invention to provide a digitizing tablet system which is of a size and price which can truly make it a "mouse substitute" device.

It is another object of this invention to provide a digitizing tablet system which operates in a dual mode indicating either relative movement or absolute position under the control of the user.

Other objects and benefits of the invention will become apparent from the detailed description which follows hereinafter when taken in conjunction with the drawing figures which accompany it.

SUMMARY

The foregoing objects have been attained by the dual-mode digitizing tablet system of the present invention for providing inputs to a user program running in a computer to allow a user to control the operation of the user program comprising, a tablet having an active surface portion and an output connected to the computer; sensible cursor device means connected to the tablet and moveable over the active surface for generating a first signal at the output of the tablet reflecting the position on the active surface of the cursor device means, the cursor device means having at least two switch-activating buttons and including means for generating a second signal at the output of the tablet reflecting the pushing of the buttons by a user; position history table means for holding at least a last position of the cursor device means; menu definition table means disposed in the computer and holding a plurality of entries for defining menu selections associated with the user program as a function of pre-established positions on the active surface of the tablet; dual-mode logic means disposed between the tablet and cursor device means on one side and the user program on another side for determining a present absolute location of the cursor device means on the active surface of the tablet and storing it in the position history table means, for outputting the present absolute location of the cursor device means on the active surface of the tablet to indicate a menu selection location when a pre-selected one of the switch-activating buttons is pressed by a user, for otherwise outputting both the present absolute location of the cursor device means on the active surface of the tablet and an indication of relative movement of the cursor device means across the active surface of the tablet by the user being the difference between the present location of the cursor device means on the active surface of the tablet and a next previous location of the cursor device means on the active surface of the tablet from the position history table means, and for outputting an indication when other than the pre-selected one of the switch-activating buttons is pressed by the user; and, interfacing program means disposed in the computer between the dual-mode logic means and the user program for receiving the present absolute location of the cursor device means on the active surface of the tablet when the pre-selected one of the switch-activating buttons is pressed by a user, for using the present absolute location of the cursor device means on the active surface of the tablet to retrieve an associated one of the menu selections for the location from the menu definition table means, and for providing the associated one of the menu selections to the user program whereby the user can selectively control the use of the cursor device means as an absolute position device or as a relative movement device.

In the preferred embodiment, the interfacing program means includes means for determining if the user program expects data from an absolute device or a relative device and for providing the appropriate one to the user program from the present absolute location of the cursor device means on the active surface of the tablet and the indication of relative movement of the cursor device means across the active surface of the tablet by the user as received from the dual-mode logic means. Also, there are menu overlay means positioned on the active surface of the tablet and containing a plurality of indicia thereon for associating the pre-established positions on the active surface of the tablet with the menu selections associated with the user program as a function of the pre-established positions as contained in the menu definition table means as well as clip means on the active surface of the tablet for positioning and holding the menu overlay means in a pre-established position on the active surface of the tablet with the indicia disposed over respective ones of associated the pre-established positions on the active surface of the tablet.

DESCRIPTION OF THE DRAWINGS

FIG. 1 is a simplified side view of a prior art mouse type input device.

FIG. 2 is a simplified front view of the mouse type input device of FIG. 1.

FIG. 3 is a simplified top view of the mouse type input device of FIGS. 1 and 2.

FIG. 4 is a simplified top view of a prior art puck type input device as employed with a digitizer tablet.

FIG. 5 is a simplified front view of the puck type input device of FIG. 4.

FIG. 6 is a simplified side view of the puck type input device of FIGS. 4 and 5.

FIG. 7 is a simplified plan view of a prior art digitizer tablet as employed with the puck type input device of FIGS. 4–6.

FIG. 8 is a simplified plan view of the digitizer tablet of FIG. 7 showing the prior art method of using the tablet when employing a menu therewith.

FIG. 9 is a simplified top view of a preferred dual mode cursor/mouse type input device as employed in the system of the present invention.

FIG. 10 is a simplified front view of the cursor/mouse type input device of FIG. 9.

FIG. 11 is a simplified top view of the cursor/mouse type input device of FIGS. 9 and 10.

FIGS. 12 and 13 are simplified plan views of a prior art digitizer tablet such as that of FIG. 7 showing the approach of the present invention for using the tablet when employing a menu therewith.

DESCRIPTION OF THE PREFERRED EMBODIMENT

Figure 14:
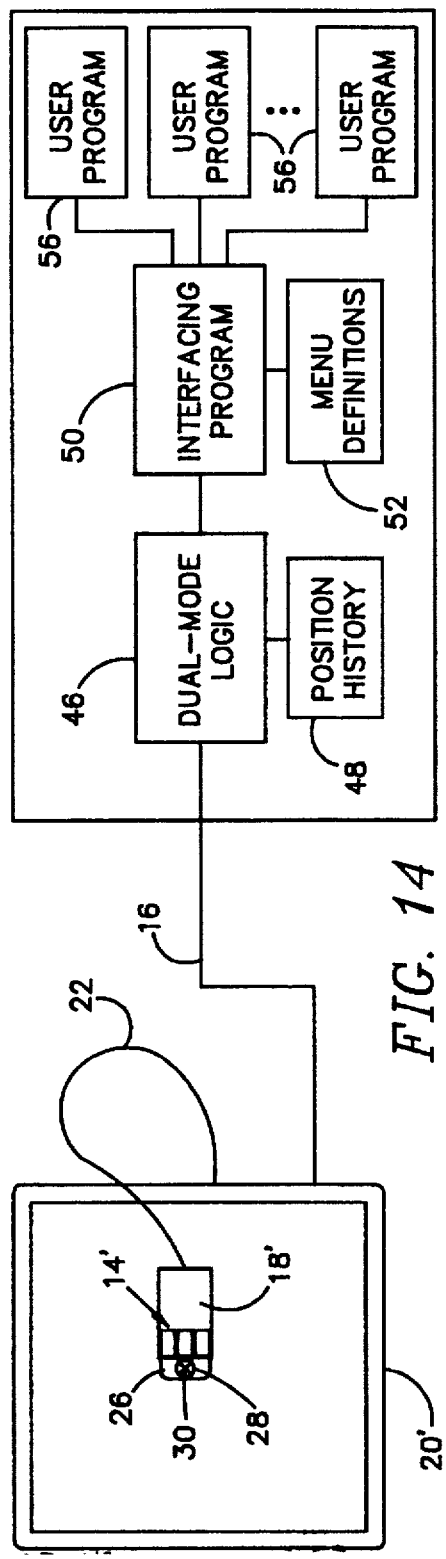
FIG. 14 is a drawing of the tablet employed in the preferred embodiment of the present invention depicting the way it is employed when it is being employed by a user to make a menu selection.

The elements of a dual-mode cursor/mouse digitizing tablet system as will soon be sold commercially by the assignee of this application under the trademark WIZ are depicted in FIGS. 9–15. There is a cursor/mouse cursor device 18' (FIGS. 9–11) and a tablet 20' (FIGS. 12–13). The actual sensing system employed is conventional and, therefore, will not be addressed herein. The major point of novelty is the system as a whole, as depicted in functional block diagram form in FIG. 14, and the logic employed therein, as depicted in the logic flowchart of FIG. 15.

The cursor device 18' is of a unique design intended to give the typical mouse user the familiar feel of a mouse and is the subject of co-pending application Sr. No. 431,884, filed Nov. 6, 1989 entitled DIGITIZER CURSOR/MOUSE WITH UNITARY SWITCH ACTUATORS by Lynn H. Rockwell, which is assigned to the common assignee of this application and being filed on even date herewith. While the cursor device 18' provides the feel of a mouse to a user, it still possesses a transparent frontpiece 26 carrying the coil of wire 28 used for position sensing as well as the crosshairs 30 for positioning the coil of wire 28 over a menu selection as will be described shortly.

The tablet 20' is of generally conventional design; but, to eliminate the setup requirements of the prior art approach of FIG. 8 and provide flexibility and interchangeability, it has menu retaining and alignment clips 38 provided in the top surface 40 adjacent the edges of the active area 24 as best seen with reference to FIG. 12. The tablet 20' of the commercial WIZ system will be about the size of a standard writing tablet (i.e. about nine by twelve inches) with the active area 24 being about nine inches square. This small size (and attendant small footprint and small selling price) was made possible by unique manufacturing techniques implemented by the assignee hereof in order to make the WIZ system meet its stated objective of being a practical replacement for a mouse for the common (i.e. non-commercial) user. As depicted in FIG. 12, the clips 38 hold a selected rectangular plastic menu overlay 42 corresponding to the program in use in an exact and reproducible position on the active area 24. Each menu overlay 42 has menu selections 44 printed thereon for its associated program. Thus, the interfacing selection logic can be pre-programmed at the factory as to the absolute positions of the menu selections 44 and, therefore, no setup by the user is required, ever. Note also that there is no "working area" associated with the menu overlay 42. This is because of the unique dual-mode approach of the present invention.

As will be realized from an in-depth review of the above-referenced, co-pending Rockwell application, the three buttons 14' at the front of the cursor device 18' are, in fact, bi-directional actuators each connected to two microswitches. By depressing the front edge of a button 14', one switch is actuated while by depressing the back edge of the same button 14', a second switch is actuated. Thus, the cursor/mouse cursor device 18' in its preferred embodiment has six switches that can be activated by a user. One of the switches is associated with a MENU SELECT function. Hereinafter and in the claims that follow, when the "MENU SELECT button" is referred to, it means that button 14' which closes the switch associated with a MENU SELECT function when it is pushed.

As depicted in FIG. 14, the signals out of the tablet 20' on connecting cable 16 are provided to the remainer of the system comprising dual-mode logic 46, position' history memory 48, interfacing program 50, and menu definitions 52 contained within the computer 54. While dual-mode logic 46 and interfacing program 50 are depicted for convenience and ease of understanding as separate entities, in an actual implementation they would probably be combined together. Similarly, in the preferred implementation the dual-mode logic 46 and interfacing program 50 would most likely be implemented as computer software. Those skilled in the art will readily recognize and appreciate that the implementation of the dual-mode logic 46 and interfacing program 50 could be done in other ways well known in the art within the scope and spirit of this invention. The programming approach is preferred only because of its simplicity and low cost which aid in obtaining the objectives of the invention.

As can be seen from FIG. 14, the dual-mode logic 46 and interfacing program 50 are positioned between the tablet 20' (with cursor device 18') providing the user's inputs and the user programs 56 within the computer 54 operating and being controlled by the user. The menu definitions 52 are pre-established and relate absolute locations on the active area 24 of the tablet 20' with menu selections 44 on various overlays 42 with their corresponding menu selections within the associated user program 56. Thus, if the user is running a user program 56 called "WRITE", an overlay 42 for the WRITE program is placed in the clips 38 to properly and accurately align it on the active area 24 of the tablet 20'. The user then makes menu selections within the WRITE program by positioning the crosshairs 30 of the cursor device 18' over that menu selection 44 on the overlay 42 and presses the MENU SELECT button 14'. The interfacing program 50 then looks up the location of the cursor device 18' when the MENU SELECT button 14' was pushed in the menu definitions 52 in that portion containing the pre-established definitions for the program WRITE. Associated with the location in the menu definitions 52 is the corresponding menu selection, which is then passed on to the user program WRITE. This overall approach is accomplished as follows.

Figure 15:
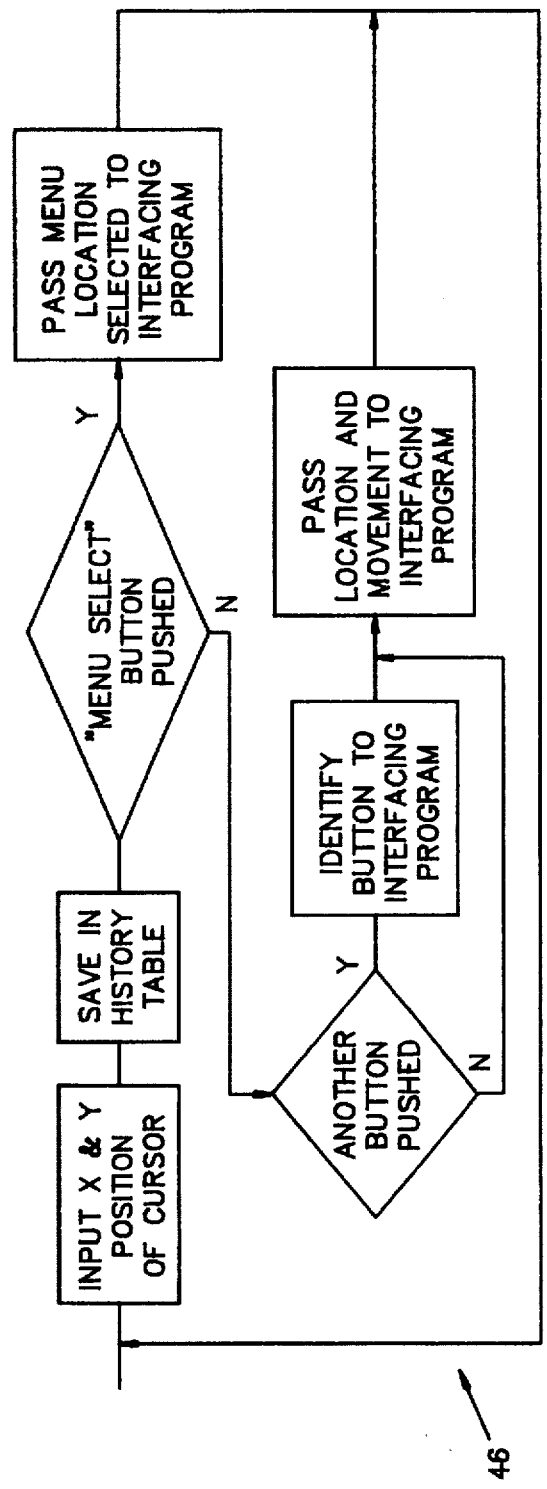
FIG. 15 is a drawing of the tablet employed in the preferred embodiment of the present invention depicting the way it is employed when it is not being employed by a user to make a menu selection.

Signals from the cursor 18' and tablet 20' representing the present position of the cursor 18' (i.e. the sensed coil of wire 28) as well as the pushing of any of the buttons 14' by the user are input from the tablet 20' to the computer 54 (and dual-mode logic 46) over the connecting cable 16 mentioned earlier. As depicted in FIG. 15, the logic 46 inputs the X and Y (i.e. absolute) position of the cursor device 18' and saves it in the position history memory 48. It then checks to see if the "MENU SELECT" button 14' has been pressed by the user. If it has, the user is using the cursor device 18' in its absolute mode to indicate a menu selection. In such case, the logic 46 passes the menu selection location to the interfacing program 50. The interfacing program 50 uses the location to access the pre-established menu definitions contained in the menu definitions 52 for the user program 56 which is presently operating in the manner described above. If the "MENU SELECT" button 14' has not been pressed by the user, the cursor device 18' is not being operated in the absolute mode to make a menu selection. In such case, it may be operating in either a relative mode (i.e. as a mouse as in the case of a word processing program, for example) or in an absolute mode (i.e. as a digitizing cursor as in the case of a CAD program, for example). The logic 46 checks to see if any of the other buttons 14' have been pressed by the user and, if one has, the particular button 14' (i.e. the switch associated therewith) is identified to the interfacing program 50. In either case, the logic 46 then passes on both the present absolute location of the cursor device 18' and its relative movement since the last update to the interfacing program 50. The interfacing program 50 then passes either the position or the movement to the user program 56 presently operating, as appropriate. This knowledge is pre-programmed into the interfacing program 50 at the same time as the menu definitions 52 and, if desired, can be provided as part of the menu definitions information to accessed in tabular form by a general purpose interfacing program. In such case, to add additional user programs 56, only additional data to the menu definitions 52 would have to be provided.

Thus, it can be seen from the foregoing description that the present invention has truly met its stated objective by providing a mouse substitute digitizing tablet device which can provide all the benefits of a selectable menu digitizing tablet with the flexibility and feel of a mouse—all at a low cost and small size which can put the benefits thereof virtually in the hands of any user.

Wherefore, having thus described our invention, what is claimed is:

1. In a digitizing tablet system wherein the position on the surface of a tablet of a cursor device is sensed and signals reflecting the position of the cursor device are output to a computer connected thereto for use by a computer program running therein, and where the cursor device has at least two cursor selectors, the improvement to provide for user-controlled, dual-mode operation of the cursor device comprising:

a) position history table means for holding at least a last position of the cursor device;

b) mode selection means carried by the cursor device for manual activation by a user to select between first and second modes of operation of the cursor device on the tablet and for outputting a mode signal indicating a selection of one of said first and second modes of operation by a user, wherein said mode selection means is a first of the at least two cursor selectors and is dedicated to selecting between the first and second modes of operation; and, c) dual-mode logic means disposed between the tablet and cursor device on one side and the computer program on another side for determining a present absolute location of the cursor device on the surface of the tablet and storing it in said position history table means, for receiving said mode signal from said mode selection means, for supplying the computer program with said present absolute location of the cursor device on the surface of the tablet to indicate a positional location when said mode signal indicates that a first mode of operation has been selected by a user, and for supplying the computer program with both said present absolute location of the cursor device on the surface of the tablet and an indication of relative movement of the cursor device across the surface of the tablet by the user being the difference between said present location of the cursor device on the surface of the tablet and a next previous location of the cursor device on the surface that a second mode of operation has been selected by a user whereby a user can use said mode selection means to selectively control the use of the cursor device as an absolute position device or as a relative movement device.

2. The improvement to a digitizing tablet system of claim 1 wherein the computer program includes at least one user program and additionally comprising:
 a) a switch-activating selection button carried by the cursor device wherein said selection button is associated with a second of the at least two cursor selectors;
 b) menu definition table means disposed in the computer and holding a plurality of entries for defining menu selections associated with said user program as a function of pre-established positions on the surface of the tablet; and,
 c) interfacing logic means disposed in the computer between said dual-mode logic means and said user program for receiving said present absolute location of the cursor device on the surface of the tablet when said switch-activating selection button is pressed by a user while the cursor device is operating as an absolute position device, for using said present absolute location of the cursor device on the surface of the tablet to retrieve an associated one of said menu selections for said location from said menu definition table means, and for providing said associated one of said menu selections to said user program.

3. The improvement to a digitizing tablet system of claim 2 and additionally comprising:
 menu overlay means positioned on the surface of the tablet and containing a plurality of indicia thereon for associating said pre-established positions on the surface of the tablet with said menu selections associated with said user program as a function of said pre-established positions as contained in said menu definition table means.

4. The improvement to a digitizing tablet system of claim 3 and additionally comprising:
 repeatable positioning means carried by the tablet for repeatedly positioning and holding said menu overlay means in a pre-established position on the surface of the tablet with said indicia disposed over respective ones of associated said pre-established positions on the surface of the tablet.

5. In a digitizing tablet system wherein the position on the surface of a tablet of a cursor device is sensed and signals reflecting the position of the cursor device are output to a computer connected thereto for use by a computer program running therein, and where the cursor device has a least two selectors, the improvement to provide for user-controlled, dual-mode operation of the cursor device comprising:
 a) position history table means for holding at least a last position of the cursor device;
 b) mode selection means carried by the cursor device for manual activation by a user to select between first and second modes of operation of the cursor device on the tablet and for outputting a mode signal indicating a selection of one of said first and second modes of operation by a user, wherein said mode selection means is a first of the at least two cursor selectors and is dedicated to selecting between the first and second modes of operation;
 c) dual-mode logic means disposed between the tablet and cursor device on one side and the computer program on another side for determining a present absolute location of the cursor device on the surface of the tablet and storing it in said position history table means, for receiving said mode signal from said mode selection means, for supplying the computer program with said present absolute location of the cursor device on the surface of the tablet to indicate a positional location when said mode signal indicates that a first mode of operation has been selected by a user, and for supplying the computer program with both said present absolute location of the cursor device on the surface of the tablet and an indication of relative movement of the cursor device across the surface of the tablet by the user being the difference between said present location of the cursor device on the surface of the tablet and next previous location of the cursor device on the surface of the tablet from said position history table means when said mode signal indicates said mode selection means to selectively control the use of the cursor device as an absolute position device or as a relative movement device;
 d) a switch-activating selection button carried by the cursor device wherein said selection button is associated with a second of the at least two cursor selectors;
 e) menu definition table means disposed in the computer and holding a plurality of entries for defining menu selections associated with said user program as a function of pre-established positions on the surface of the tablet;
 f) interfacing logic means disposed in the computer between said dual-mode logic means and said user program for receiving said present absolute location of the cursor device on the surface of the tablet when said switch-activating selection button is pressed by a user while the cursor device is operating as an absolute position device, for using said present absolute location of the cursor device on the surface of the tablet to retrieve an associated one of said menu selections for said location from said menu definition table means, and for providing said associated one of said menu selections said user program; and,
 g) menu overlay means positioned on the surface of the tablet and containing a plurality of indicia thereon for associating said pre-established positions on the surface of the tablet with said menu selections associated with said user program as a function of said pre-established positions as contained in said menu definition table means.

6. A dual-mode digitizing tablet system wherein movement of a cursor on a working surface of a tablet as a positional device or a relative movement device is under the control of a user of the cursor comprising:

a) a cursor with at least two selectors;

b) a tablet having a working surface and including means for sensing positions of said cursor on said working surface and for outputting signals reflecting said positions of the cursor to a computer connected thereto for use by a computer program running therein;

c) position history table means for holding at least a last position of said cursor;

d) mode selection means carried by said cursor for manual activation by a user to select between positional and relative movement modes of operation of said user on said working surface of said tablet and for outputting a mode signal indicating a selection of one of said positional and relative movement modes of operation by a user, wherein said mode selection means is a first of the at least two cursor selectors and is dedicated to selecting between the positional and relative movement modes of operation;

e) dual-mode logic means disposed between said tablet and cursor on one side and the computer program on another side for determining a present absolute location of said cursor on said working surface of said tablet and storing it in said position history table means, for receiving said mode signal from said mode selection means, for supplying the computer program with said present absolute location of said cursor on said working surface of said tablet to indicate a positional location when said mode signal indicates that a positional mode of operation has been selected by a user, and for supplying the computer program with both said present absolute location of said cursor on said working surface of said tablet and an indication of relative movement of said cursor across said working surface of said tablet by the user being the difference between said present location of said cursor on said working surface of said tablet and a next previous location of said cursor on said working surface of said tablet from said position history table means when said mode signal indicates that a relative movement mode of operation has been selected by a user whereby a user can use said mode selection means to selectively control the use of said cursor as an absolute position device or as a relative movement device.

7. The dual-mode digitizing tablet system of claim 6 wherein the computer program includes at least one user program and additionally comprising:

a) a switch-activating selection button carried by said cursor wherein said selection button is associated with a second of the at least two cursor selectors;

b) menu definition table means disposed in the computer and holding a plurality of entries for defining menu selections associated with said user program as a function of pre-established positions on said working surface of said tablet; and c) interfacing logic means disposed in the computer between said dual-mode logic means and said user program for receiving said present absolute location of said cursor on said working surface of said tablet when said switch-activating selection button is pressed by a user while said cursor is operating as an absolute position device, for using said present absolute location of said cursor on said working surface of said tablet to retrieve an associated one of said menu selections for said location from said menu definition table means, and for providing said associated one of said menu selections to said user program.

8. The dual-mode digitizing tablet system of claim 7 and additionally comprising:

menu overlay means positioned on said working surface of said tablet and containing a plurality of indicia thereon for associating said pre-established positions on said working surface of said tablet with said menu selections associated with said user program as a function of said pre-established positions as contained in said menu definition table means.

9. The dual-mode digitizing tablet system of claim 8 and additionally comprising:

repeatable positioning means carried by said tablet for repeatedly positioning and holding said menu overlay means in a pre-established position on said working surface of said tablet with said indicia disposed over respective ones of associated said pre-established positions on said working surface of said tablet.

10. A dual-mode digitizing tablet system wherein movement of a cursor on a working surface of a tablet as a positional device or a relative movement device is under the control of a user of the cursor comprising:

a) a cursor with at lease two selectors;

b) a tablet having a working surface and including means for sensing positions of said cursor on said working surface and for outputting signals reflecting said positions of the cursor to a computer connected thereto for use by a computer programs running therein;

c) position history table means for holding at least a last position of said cursor;

d) mode selection means carried by said cursor for manual activation by a user to select between positional and relative movement modes of operation of said cursor on said tablet and for outputting a mode signal indicating a selection of one of said positional and relative movement modes of operation by a user wherein said mode selection means is a first of the at least two cursor selectors and is dedicated to selecting between the positional and relative movement modes of operation;

e) dual-mode logic means disposed between said tablet and cursor device on one side and the computer program on another side for determining a present absolute location of said cursor on said working surface of said tablet and storing it in said position history table means, for receiving said mode signal from said mode selection means, for supplying the computer program with said present absolute location of said cursor on said working surface of said tablet to indicate a positional location when said mode signal indicates that a positional mode of operation has been selected by a user, and for supplying the computer program with both said present absolute location of said cursor on said working surface of said tablet and an indication of relative movement of said cursor across said working surface of said tablet by the user being the difference between said present location of said cursor on said working surface of said tablet and a next previous location of said cursor on said working surface of said tablet from said position history table means when said mode signal indicated that a relative movement mode of operation has been selected by a user whereby a user can use said mode selection means to selectively control the use of said cursor as an absolute position device or as a relative movement device;

f) a switch-activating selection button carried by said cursor wherein said selection button is associated with a second of the at least two cursor selectors;

g) menu definition table means disposed in the computer and holding a plurality of entries for defining menu selections associated with said user program as a function of pre-established positions on said working surface of said tablet;

h) interfacing logic means disposed in the computer between said dual-mode logic means and said user program for receiving said present absolute location of said cursor on said working surface of said tablet when said switch-activating selection button is pressed by a user while said cursor is operating as an absolute position device, for using said present absolute location of said cursor on said working surface of said tablet to retrieve an associated one of said menu selections for said location from said menu definition table means, and for providing said associated one of said menu selections to said user program; and i) menu overlay means positioned on said working surface of said tablet and containing a plurality of indicia thereon for associating said pre-established positions on said working surface of said tablet with said menu selections associated with said user program as a function of said pre-established positions as contained in said menu definition table means.

* * * * *